United States Patent [19]

Hsing

[11] Patent Number: 4,658,398
[45] Date of Patent: Apr. 14, 1987

[54] FRAMED DIGITAL VOICE SUMMING FOR TELECONFERENCING

[75] Inventor: To R. Hsing, Sudbury, Mass.

[73] Assignee: GTE Laboratories Incorporated, Waltham, Mass.

[21] Appl. No.: 666,042

[22] Filed: Oct. 29, 1984

[51] Int. Cl.[4] .......................... H04J 3/02; H04M 3/56
[52] U.S. Cl. ........................................ 370/62; 379/202
[58] Field of Search ...................... 370/62; 179/18 BC

[56] References Cited

U.S. PATENT DOCUMENTS

| | | | |
|---|---|---|---|
| 4,254,497 | 3/1981 | Funderburk et al. | 370/62 |
| 4,359,603 | 11/1982 | Heaton | 370/62 |
| 4,387,457 | 6/1983 | Münter | 370/62 |
| 4,488,291 | 12/1984 | Eschmann et al. | 370/62 |
| 4,499,578 | 2/1985 | Marouf et al. | 370/62 |

FOREIGN PATENT DOCUMENTS 3329779 3/1985 Fed. Rep. of Germany ........ 370/62

OTHER PUBLICATIONS

Satyan G. Pitroda and Bernard J. Rekiere, "A Digital Conference Circuit for an Instant Speaker Algorithm", *Transaction of Communication Technology*, vol. Com-19, No. 6, pp. 1069-1076, Dec. 1971.

Primary Examiner—Thomas W. Brown
Attorney, Agent, or Firm—Hamilton, Brook, Smith & Reynolds

[57] ABSTRACT

In a teleconferencing system activity levels of digital voice signals are compared over activity selection times and the signals are multiplied, over frame delays, by predetermined constants dependent on the relative levels of activity. The most active signal is multiplied by a constant of at least about 0.8, so that signal dominates through a frame delay, but the frame delays are sufficiently short that multiple speakers can be understood from the summed signal. No speaker maintains dominance for a sufficiently long time to substantially suppress speech of others.

7 Claims, 2 Drawing Figures

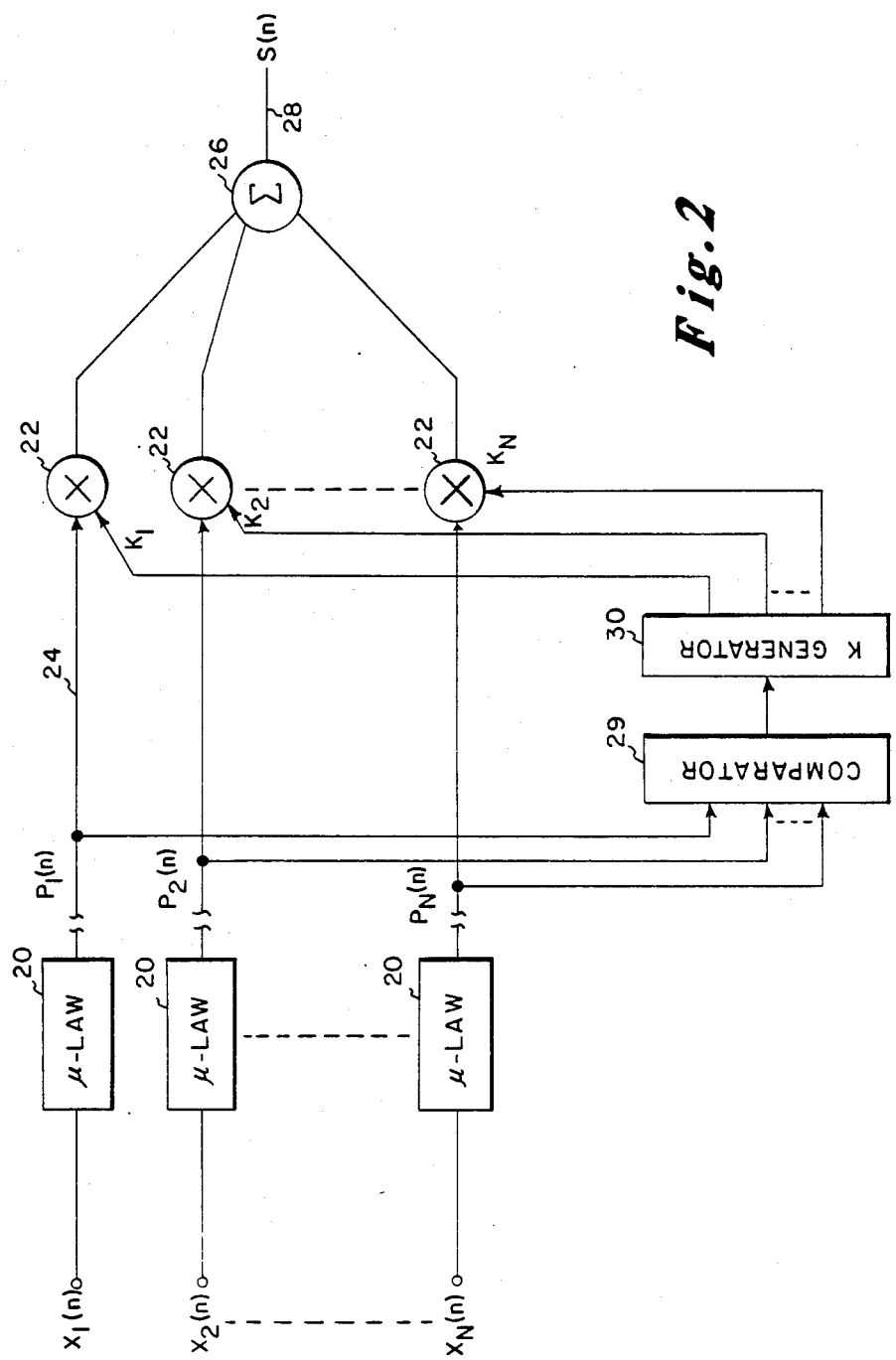

FRAMED DIGITAL VOICE SUMMING FOR TELECONFERENCING

RELATED APPLICATION

U.S. application Ser. No. 666,052 Digital Voice Summing for Teleconferencing, filed by T. Russell Hsing, Oct. 29, 1984.

TECHNICAL FIELD

The present invention relates to a electronic signal processing and in particular to the summing of digital voice signals in telephone conferencing.

BACKGROUND

In telephone conferencing a number of voice signals from each telephone set involved in the conference must be combined and transmitted back to each of the telephone sets. The number of voice signals can be combined at a central exchange for example. With conventional analog telephones, the combination of the signals is straightforward. The several signals need only be summed together. To avoid overdrive of the final signal, each summed signal is generally reduced by an amount proportional to the number of signals being combined. For example, in a three-way conference, one-third of each signal is summed.

Conventional analog telephones are being replaced by digital telephones. In such systems, the analog signals are sampled at each telephone set at a rate of twice the band width of the analog signal or about eight kilohertz. Each sample is then quantized as one of a discrete set of prechosen values and encoded as a digital word which is then transmitted over the telephone lines. With eight bit digital words, for example, the analog sample is quantized to $2^8$ or 256 levels, each of which is designated by a different eight bit word. In linear pulse code modulation (PCM) systems, the 256 possible values of the digital word are linearly related to corresponding analog amplitudes. As a result, the digital values can be summed as with the combination of analog signals.

Because most speech is found at the lower analog signal amplitudes, encoding techniques have been developed which maintain high resolution at the lower amplitudes but which provide lesser resolution at higher amplitudes. Such approaches reduce the number of bits required in each word. An example of such an encoding technique is the $\mu$ law technique by which the quantization levels are based on a logarithmic function. As a result of the nonlinear relationship between the encoded digital signals and the underlying analog voice signals, the digital signals cannot simply be proportionately reduced and summed. Such direct summation results in severe distortion. Typically, as shown in FIG. 1, such $\mu$ law encoded signals which must be combined for teleconferencing are first converted back to analog signals through an inverse $\mu$ law device 12 and the analog signals are summed in summer 14. The resultant combined signals are then again encoded through a $\mu$ law encoder 16. This approach introduces extra quantization noise and more hardware implementation due to the extra conversion from digital to analog and back to digital.

An alternative to reverting back to analog form is to determine an "Active Speaker" by comparing each conferee's digital samples during each of sequential time frames. Once the active speaker is determined, only the digital voice signal from that speaker is transmitted to the others through a time frame. Such an approach can result in chopping of words as the active speaker status is passed from one conferee to another and does prevent simultaneous transmission from multiple speakers.

DISCLOSURE OF THE INVENTION

In electronic circuitry for combining digital voice signals in teleconferencing the activity levels of signals to be combined are compared. A multiplier is then generated for each of the digital voice signals with the multiplier for the most active digital signal being substantially greater than the other multipliers. The sum of the multipliers is about equal to one. Each multiplier is applied to a multiplier circuit along with a series of digital samples of the digital voice signal. The outputs of the multipliers are summed to provide a single teleconferencing output.

In a preferred system, the activity level of each digital signal is taken as the average value of the signal over a plurality of samples such as about 64 samples in an 8000 sample per second system. The multiplier for the most active digital signal is at least about 0.8 and a single set of multipliers is applied through a frame of 64 samples. In a specific system in which 3 signals are combined the multipliers applied to the 3 signals are 0.8, 0.17, and 0.03.

Digital coding techniques to which the present invention can be applied include $\mu$ law encoding and adaptive PCM encoding.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a schematic diagram of a system embodying the present invention

DESCRIPTION OF PREFERRED EMBODIMENTS

Figure 1:
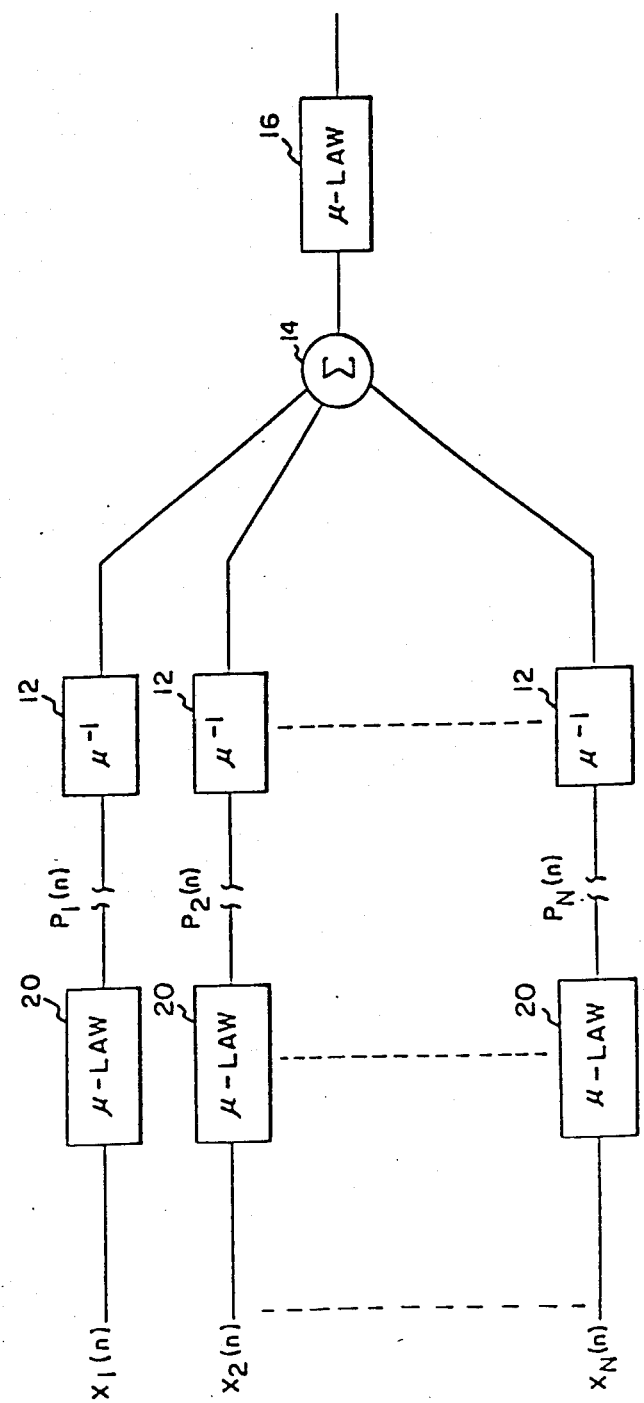
FIG. 1 is a schematic illustration of a prior art approach to voice summing of $\mu$ law encoded signals.

As shown in FIG. 2, a plurality of sampled signals $X_j(n)$ are converted to digital voice signals $P_j(n)$ by $\mu$ law encoders 20 of respective conferee telephone sets. Those digital signals are transmitted to, for example, a central exchange where they are to be combined. In accordance with the present invention, each digital signal $P_j$ is applied to a digital multiplier 22 where it is multiplied by a weighting multiplier $K_j$. For example, with an 8 bit $\mu$ law encoded word on line 24, the value of the 8 bit word, between 0 and 256, is multiplied by a constant $K_1$. The weighted outputs of the multipliers are applied to a digital summer 26 to provide a combined digital voice signal $S(n)$ on line 28, where $$S(n) = K_1(n)P_1(n) + K_2(n)P_2(n) + \ldots + K_N(n)P_N(n)$$

$$K_1 + K_2 + \ldots + K_N = 1$$

and $$K_a > K_b > \ldots$$

where $K_a$ is the multiplier for the most active channel, $K_b$ is for the next most active channel and so on.

In accordance with the present invention the multipliers K need not be generated for each sample of each digital signal. Based on an average activity level through a past series of samples, multipliers are selected for a future series of samples. The multipliers are selected such that the most active channel is given the dominant weighting by means of a multiplier of at least about 0.8. The activity selection time during which each channel is monitored in order to determine the dominant multiplier is sufficiently long that the most active channel is not determined by spurious signals or short instances of inactivity. The subsequent time frame during which the indicated channel maintains dominant weighting must then be sufficiently long to provide meaningful information despite zero crossings. On the other hand, the frame of samples during which an active channel cannot lose the dominant multiplier must be limited so that the other channels are not perceived as being removed from the system. In normal speech, even a very active channel will be found to be inactive for 60 to 70 percent of the time. Thus, by sufficiently limiting the time frame during which the most active channel is given control, even less active channels can be given the dominant multiplier for sufficient lengths of time, during inactive portions of the most active channel, to allow adequate transmission of the less active signals.

Experimentation has shown that the K for the most active speaker should be between 0.8 and 0.9. The next most active speaker should be provided a K between 0.1 and 0.2.

In a specific example of the present invention, a 4 kilohertz bandwidth signal is sampled at a rate of 8000 samples per second. Each digital signal is monitored by a comparator 29 over activity selection times of 8 milliseconds which includes 64 samples. The comparator 29 makes a comparison of the average values of the digital samples without regard to the actual values of the underlying analog signals. If the comparator 29 determines that there is only one active channel, then K for that channel is set by a K generator 30 at 1.0 for the next 8 milliseconds or 64 samples, and the other Ks are set at 0. If it is determined that there are 2 active speakers, the most active is provided with a K equal to 0.85 and the second channel is provided with a K equal to 0.15. If it is determined that there are 3 active channels, the most active is provided with a K equal to 0.8, the second most active is provided with a K equal to 0.17 and the third K is set at 0.03. The system may also accommodate more conferees, but a listener has difficulty distinguishing between more than three conferees so the less active conferees should generally have Ks close to or equal to 0. It will be recognized that, in each case, the Ks determined by K generator 30 are only maintained for a limited frame so each conferee frequently has the opportunity to become the more dominant speaker.

Because the Ks which may be required by a system can be limited to a small number of specific predetermined values and need only be generated once each frame time, the K generator can be electronically very simple including only a small read only memory (ROM).

The K values specified above are the results of experimental work with $\mu$ law encoded signals. It will be recognized that the specifics of the K values may vary with different applications, and systems may even be provided with means for adjusting the K value for optimal tuning.

By weighting the digital voice signals as a function of the digital values of those signals, lesser portions of the low level signals are provided to the summing circuit 26. Distortion in the combined signal due to the nonlinearities of the $\mu$ law coding can be substantially avoided while still providing some of the less active signals on the line. Providing portions of the less active channels minimizes chopping of words as conferees become more dominant and also provides some signal from the less dominant conferees throughout a conversation.

The present invention is not limited to $\mu$ law encoding. For example, in feed-forward adaptive PCM companders both a code word P(n) and the gain G(n) are transmitted. The gain estimate signal G is inversely related to the activity of the conferee. Thus, the digital voice signal having the lower G value is given greater wait in the summation.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. Electronic signal processing apparatus for combining digital voice signals in teleconferencing comprising:
   comparator means for comparing the activity levels of a plurality of digital signals to be combined and for determining a most active digital signal which has the greatest activity level;
   multiplier generator means for generating a multiplier for each of the digital voice signals, the multiplier for the most active digital signal being substantially greater than the other multipliers and the sum of the multipliers being about one;
   digital multiplier means for multiplying each digital voice signal with its respective multiplier, the same multiplier being applied through a plurality of digital samples; and
   digital summing means for summing the outputs of the multiplier means.

2. Electronic signal processing apparatus as claimed in claim 1 wherein the multiplier generator means generates a multiplier for the most active digital signal of about 0.8.

3. Electronic signal processing apparatus as claimed in claim 1 wherein the comparator means compares the average values of the digital signals over a plurality of digital samples.

4. Electronic signal processing apparatus as claimed in claim 3 wherein the comparator means averages digital signals having a sample rate of about 8000 samples per second over about 64 samples.

5. Electronic signal processing apparatus as claimed in claim 4 wherein the digital multiplier means multiplies the digital voice signals with the same multipliers through about 64 consecutive samples.

6. Electronic signal processing apparatus as claimed in claim 1 wherein the multiplier generator means generates multipliers for combining 3 digital voice signals, the multipliers being about 0.80, 0.17 and 0.30.

7. Electronic signal processing apparatus as claimed in claim 1 further comprising a $\mu$ law encoder for encoding the digital voice signals.

* * * * *